May 14, 1940.　　　C. X. HASKINS　　　2,200,575
ROTARY CUTTING MACHINE
Filed Aug. 1, 1938　　　2 Sheets-Sheet 1
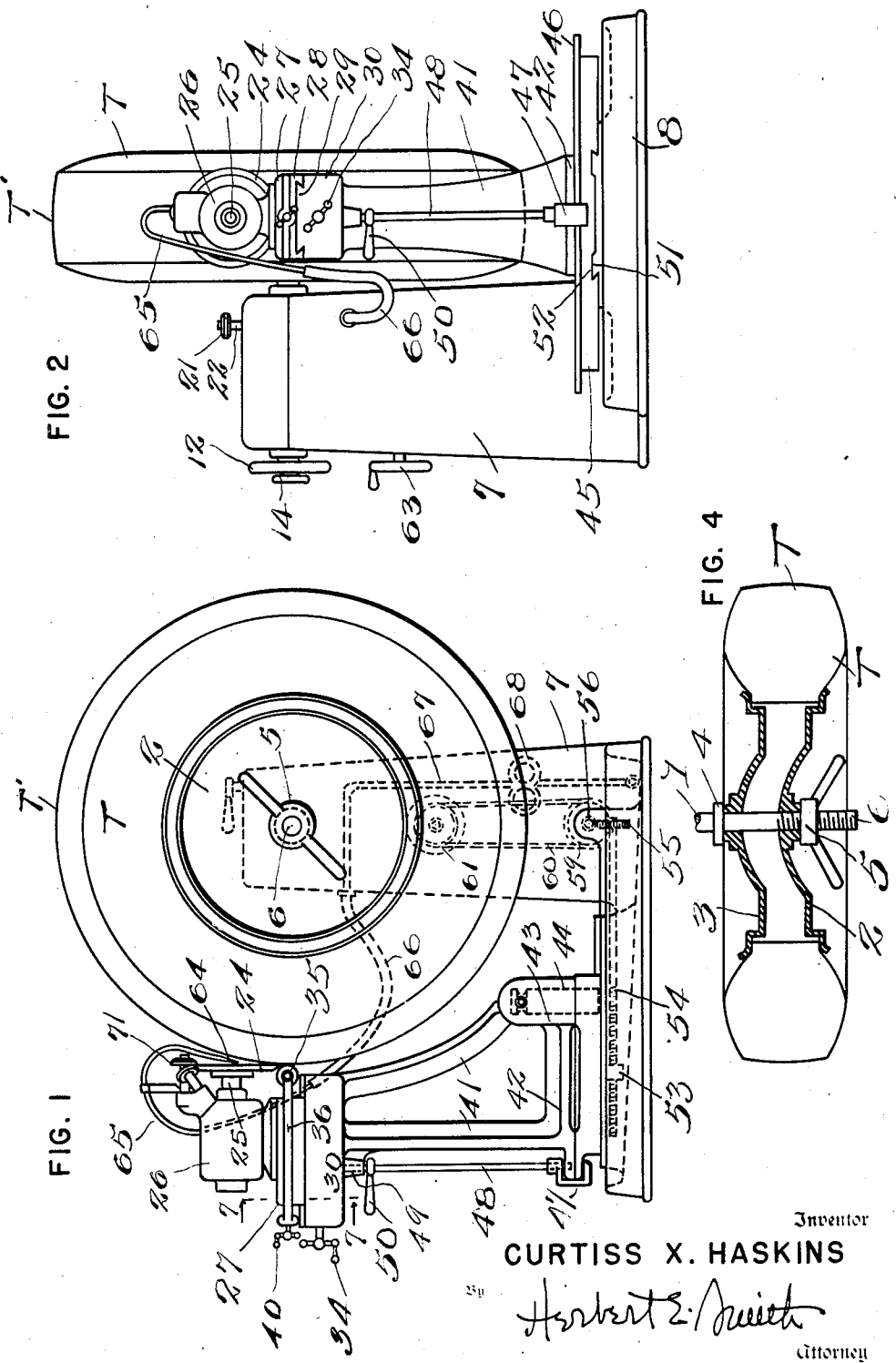
Inventor
CURTISS X. HASKINS
By Herbert E. Smith
Attorney May 14, 1940. C. X. HASKINS 2,200,575
ROTARY CUTTING MACHINE
Filed Aug. 1, 1938 2 Sheets-Sheet 2
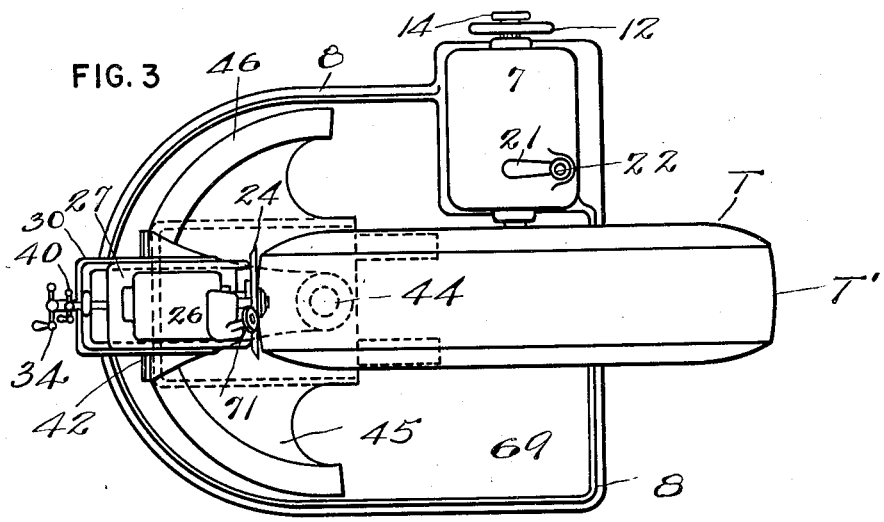
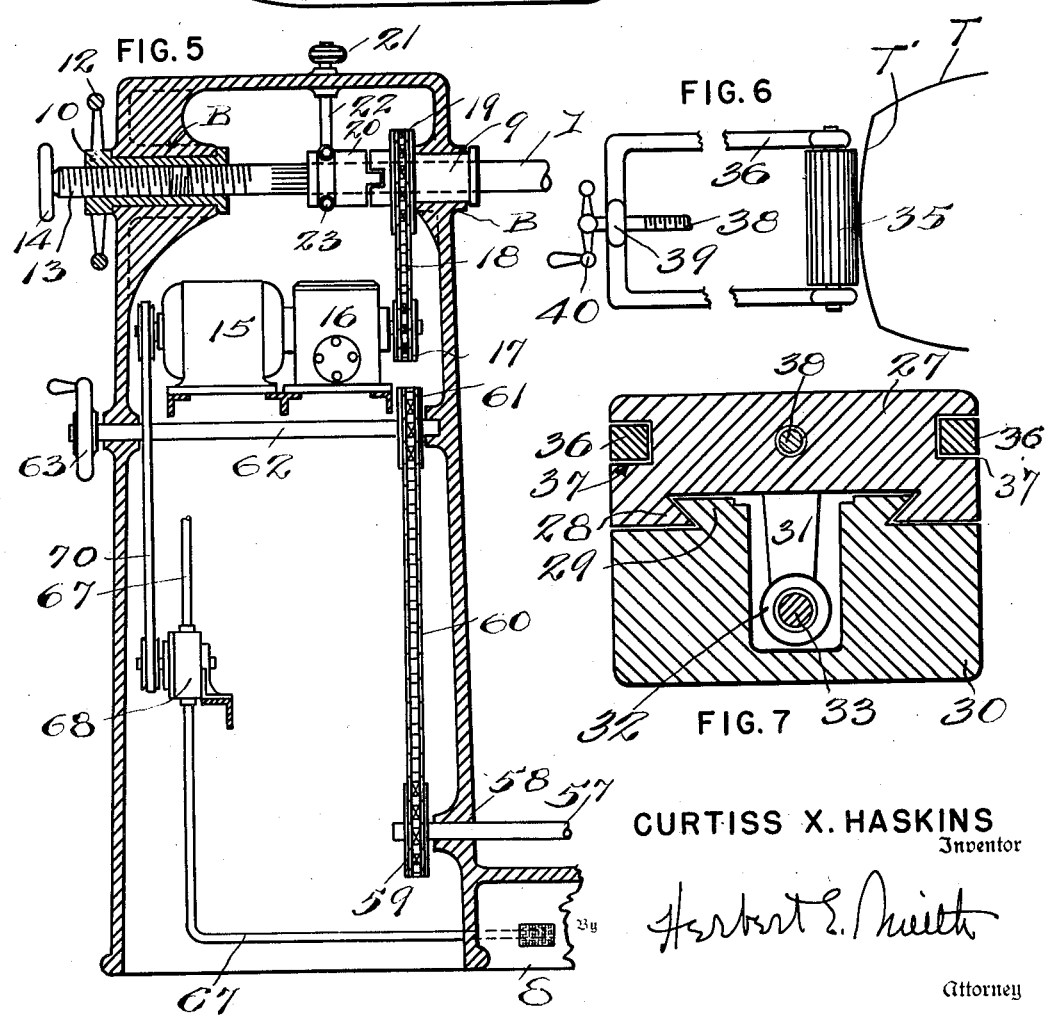
CURTISS X. HASKINS
Inventor
Herbert E. Smith
Attorney Patented May 14, 1940

2,200,575

UNITED STATES PATENT OFFICE 2,200,575

ROTARY CUTTING MACHINE

Curtiss X. Haskins, Spokane, Wash., assignor of one-half to Isaac G. Parsons, Spokane, Wash.

Application August 1, 1938, Serial No. 222,548

7 Claims. (Cl. 164—61)

My present invention relates to a rotary cutting machine of the type employing a rotary work-holder, and a rotary cutter, by means of which a strip of material is pared or peeled by the cutter from the exterior periphery of the rotating work. While my invention is capable of use with and may be embodied in machines for other purposes, the particular machine herein illustrated is especially designed for paring or peeling the material from the tread of a tire of an automotive vehicle, such as a truck, preparatory to the operation of re-treading the tire.

Worn tires are re-treaded by vulcanizing a new tread on the tire, but in order to insure best results in the re-treading operation it is necessary to trim off excess material from the worn tread, without, however, interfering with the breaker strip or the carcass of the tire. Heretofore this trimming has been accomplished manually with a knife, but this is a slow and tedious operation, and frequently the tire is damaged by the knife cutting into the breaker strip or into the carcass of the tire.

In carrying out my invention the worn tire is mounted upon a low speed rotary work-holder which is adjustable to hold tires of various sizes, and the rotary cutting tool is adjusted and fed to the tire in such manner as to pare or peel one or more strips of uniform thickness from the worn tire, after which the tire is abraded on its trimmed surface or tread, and the new tread may then be vulcanized on the tire.

I preferably employ a high speed cutter of the rotary disk type, which is mounted tangentially of the periphery of the worn tire at the approximate horizontal diameter of the tire, and a gaging device is employed in advance of the cutter to bear upon the worn tread and thereby present the tread to the cutter in such manner as to insure a paring or peeling of material from the tread of uniform thickness, regardless of any irregularities in the worn tread. In addition to means for adjusting the cutting tool for various sizes of tires, means are also provided whereby the tool may be pivotally adjusted on a perpendicular center line that passes through the body of the tire, in order that the tread may be rounded in cross section to receive the new tread.

By the combination and arrangement of parts involving the slow-speed work holder and the tire mounted thereon, and the adjustable high-speed rotary cutter, the operation of preparing the worn tread of a tire for re-treading, is simplified, the time and labor factors are substantially decreased, efficiency and accuracy in operation are insured, and a comparatively inexpensive but smooth-operating machine is provided for the required work.

The invention consists in certain novel combinations and arrangements as will hereinafter be more fully pointed out and claimed. In the accompanying drawings I have illustrated one complete example of the physical embodiment of my invention wherein the parts are combined and arranged according to one mode I have devised for the practical application of the principles of my invention, but it will be understood that changes and alterations may be made in these exemplifying structures, within the scope of my claims without departing from the principles of the invention.

Figure 1 is a view in side elevation of a machine embodying my invention, with the tire mounted on its low-speed rotary holder, and the rotary high-speed cutter in operative position with relation thereto.

Figure 2 is a front elevation of the machine, as seen from the left in Figure 1.

Figure 3 is a top plan view of the machine.

Figure 4 is a sectional view of a conventional tire showing the holder therefor mounted upon the operating shaft of the machine.

Figure 5 is a vertical sectional view through the housing of the machine in which are mounted the operating shaft of the work-holder and the motor operated driving mechanism therefor; the pump for supplying water to the cutter; and the manually operated mechanism for adjusting the cutting-tool unit with relation to the tire.

Figure 6 is a broken, detail, plan view of the adjustable gage roller and its yoke, showing the relation of the roller to the worn tire-tread.

Figure 7 is a vertical, transverse sectional view at line 7—7 of Figure 1 through the adjustable cutter-head and its bed, and also through the gage-yoke of Figure 6.

In the drawings a conventional tire is indicated as T and the worn tread is indicated as T', and as best seen in Figure 4 the tire is mounted upon the end of an operating shaft 1 by means of a holder comprising two circular disks 2 and 3 having clincher rims for engagement with the tire. The disk 3 is backed up against a fixed collar 4 on the shaft 1, and a nut 5, threaded on the threaded end 6 of the shaft, clamps the holder tight in the tire and on the end of the shaft, in order that the holder and tire may revolve or rotate with the shaft 1.

The shaft 1 is rotatably mounted in horizontal position, near the top of an upright housing 7, in spaced bearings B, B, of the housing, and the upright housing 7 is rigid with a horizontal machine base 8 on which the machine tool is mounted. Within the two spaced bearings B and B are mounted flanged bearing bushings 9 and 10, and the shaft 1 is mounted in these bushings. Bushing 9 which forms the loose member of a driving clutch, and spaced bushing 10 which longitudinally adjusts the shaft for adaptation to tires of different widths, are both retained against longitudinal movement in their bearings BB. The bushing 10 however, is threaded at 11 on one end of the shaft 1 so that by turning a handwheel 12 of the bushing the latter acts as a non-traveling nut by means of which the work-holding end of the shaft 1 may be projected or retracted in Figure 5 to accommodate the different widths of tires and to center the tire with relation to the cutting tool. After the shaft has been thus adjusted the shaft and the adjusting bushing are locked by means of a set screw 13 threaded through the outer end of the bushing, the screw being provided with a hand wheel 14 for this purpose.
The operating shaft 1 is slowly rotated from an electric motor 15 mounted within the housing 7, through reduction gears in the gear casing 16, and a sprocket-chain drive including drive gear or sprocket 17, chain 18, and the sprocket 19 rigid with the loose bushing 9 on the shaft 1. The loose bushing has end notches to receive teeth on the shiftable clutch sleeve 20 that is splined on the shaft to rotate therewith, and this sleeve is shifted into and out of engagement with the loose member of the clutch 9, by manipulating the handle 21 exterior of the housing. This handle is rigid with a spindle 22 journaled in the top of the housing, and the lower end of the spindle, within the housing, is provided with a fork 23 that engages in an annular groove of the sleeve 20 in well known manner.

For paring or peeling a strip from the worn tread of the slowly revolving or rotating tire as it turns clockwise in Figure 1, I employ a high-speed rotary cutter or circular disk 24, which as shown in Figures 1, 2, and 3 is located in a vertical plane, tangential to the tread of the tire, with its lower cutting edge at the approximate horizontal diameter of the tire.
The rotary cutter is mounted upon the end of a rotary cutter shaft 25 of an electric motor 26, and the motor is rigidly mounted upon a cutter head 27 that is adjustable toward and from the tire. The cutter head has a dovetail sliding connection at 28, 29 with the tool head or tool bed 30, which bed, as seen in Figure 7 has a central slot to accommodate the bracket 31 and a traveling nut 32 of the head, and a feed screw 33 having an exterior handle 34, is mounted in the bed and threaded in the nut for manual adjustment of the cutter head and its rotary cutter in their relation to the tire.

To insure the cutting of a peel of uniform thickness from the tire, regardless of any circumferential irregularities in its tread or periphery, I employ a gage-roller 35, which as best seen in Figure 6 extends transversely of the tire tread directly below or in front of the cutting edge of the rotary cutter. This gage roller is rigidly set to bear against the face of the tire tread and roll thereon so that the advancing periphery of the resilient tread is locally held in a fixed plane at the cutting point, and as the cutter is also held in a fixed plane, the peel or strip severed from the tread as the tire rotates, is of uniform thickness. Usually from one to four strips are successively peeled by the cutter from the worn tread, and the cutter is adjusted, together with its gage-roller for each strip to be peeled from the tread.

As seen in Figure 6 the gage roller is journaled in the ends of the arms of a U-shaped yoke 36, and these arms as seen in Fig. 7 are fitted in lateral grooves 37 of the cutter head 27. By means of a screw 38, which is threaded in the cutter head and journaled in a bearing head 39 of the yoke, and the exterior hand wheel 40 of the screw, the latter may be turned and the yoke adjusted to fit the gage roller against the resilient tire.

As best seen in Figures 1 and 2, the tool bed 30 is integrally mounted at the top of the upright standard 41 which has a horizontal bottom flange 42 and a central hub 43 by means of which the stand is pivotally mounted on an upright pin 44 standing erect on a tool-carriage 45, which carriage is adjustable toward and from the tire. The carriage is fashioned with a semi-circular or segmental top flange having the pivot pin 44 as its center, and it will be apparent that the tool stand and rotary tool may be adjusted about the pivot pin as a center, with relation to the tread of the tire. The longitudinal axis of the pivot pin is alined, perpendicularly, with the vertical axis of a horizontal cross-section of the tire at the cutting point, and therefore, by shifting the cutting tool laterally on the pivot pin, the face of the tread may be dressed or trimmed to a rounded surface T' as indicated in Figure 6, for the reception of the re-tread that is later to be applied to the tire.

For holding the stand and tool in adjusted pivoted position, I provide a clamp jaw 47 which engages under the flange 46 and over the flange 42, and an upright clamp bar 48 which is threaded in the jaw and journaled at its upper end in a bracket 49 rigid with the bed 30. By means of the handle 50 the clamp bar may be turned to clamp the bar and jaw on the two flanges to retain the pivotally adjusted stand and tool in adjusted position.

By manually operated means exterior of the housing, the carriage 45 and parts of the machine supported thereon, may be adjusted on the base 8 toward and away from the tire, thus providing for adjustment of the cutter for use with tires of different diametrical sizes. For this purpose the carriage is mounted by dovetail sliding connections 51 and 52 on the base 8 as seen in Figure 2, and the bottom of the carriage is fashioned with a nut 43 that projects through and moves along a slot in the top of the base 8. A screw bar is threaded in the nut and journaled in the base 8 and provided with a worm-wheel 55 which is in mesh with a worm 56 on a worm shaft 57 journaled in bearings 58 of the housing 7. One end of the shaft 57 projects into the housing 7 and it is provided with a sprocket wheel 59 over which a chain 60 passes from the wheel 61 on an operating shaft 62 journaled in the walls of the housing. By means of a hand wheel 63, mounted exterior of the housing on the shaft 62, the latter may be turned to actuate the sprocket gearing and transmit power through the shaft 57 to the feed screw 54 for the purpose of advancing or retracting the carriage.

To facilitate the operation of the cutter as it peels or pares a strip of rubber from the tread, water is sprayed from a nozzle 64 across the lower portion of the cutter and in contact with the tread. The nozzle is supported from the cutting tool, and water is supplied through a pipe line 65 and hose connection 66, by a water pump pipe 67 communicating with a pump 68. The pump pipe 67 extends beyond the pump and terminates in a sump 69 formed in the base 8 to catch the water falling from the rotary cutter, thus providing a continuous supply and drain for the water, and of course the supply may be replenished when required. The pump 68 is operated by an auxiliary belt drive 70 from the motor 15 as seen in Figure 5.

The cutting edge of the rotary cutter is automatically maintained in sharpened condition by means of a sharpening device that includes a pair of rotary disks 71, 71 mounted on the bracket, 72, and these sharpening disks are constantly in frictional contact with the cutting edge of the rotary cutter.

As the tire in Figure 1 rotates clockwise, and slowly, the high-speed rotary cutter severs the strip just above the gage-roller, and the latter is adjustable to regulate the thickness of the severed strip, and by adjusting the cutting tool laterally on its pivot the successive circumferential cuts may be made between the lateral shoulders of the tread to round the tread as indicated.

Having thus fully described my invention, what I claim as new and desire to secure by Letters Patent is:

1. In a tire-tread cutting machine, the combination with a rotary tire-holder and operating means therefor, of a rotary cutting tool located in a plane tangential to the tread of the tire, a gage-device mounted on the cutting tool for frictional engagement with the tire in advance of the cutting tool, and means for adjusting said tool and device with relation to the tire.

2. In a tire-tread cutting machine, the combination with a rotary tire-holder and operating means therefor, of a rotary cutting tool located in operative position with relation to the tire-tread, a gage-device mounted on the cutting tool comprising an element in frictional contact with the tire-tread in advance of the cutting tool, and means for adjusting said gage-device to vary the thickness of a strip cut from the tire-tread.

3. In a tire-tread cutting machine, the combination with a rotary tire-holder and operating means therefor, and a rotary cutting tool mounted in position tangential to the tire-tread, of a gage-yoke adjustable on the cutting tool, a roller journaled in the yoke and frictionally engaging the tire-tread in advance of the cutting tool, and means for adjusting said yoke.

4. In a tire-tread cutting machine, the combination with an operating shaft and means for rotating the shaft, of means for longitudinally adjusting said shaft, a tire-holder mounted on the longitudinally adjustable shaft, and a cutting tool arranged in operative relation to said tire-holder.

5. In a tire-tread cutting machine, the combination with a housing, spaced bushings mounted in the housing, and an operating shaft mounted in said bushings, of means for driving one of said bushings and a clutch member, co-acting with said bushing, the other bushing being internally threaded on said shaft and retained against longitudinal movement, means for turning the threaded bushing to adjust said shaft, and means for locking the shaft and bushing in adjusted position.

6. The combination with a rotary tire holder arranged centrically in a tire, means for retaining the tire on the holder, and operating means for the holder, of a carriage and means for longitudinally adjusting the carriage with relation to the tire, a laterally adjustable stand pivotally supported on the carriage, a tool-bed mounted at the top of the stand, and a rotary cutting tool mounted in said bed and longitudinally adjustable in a plane tangential to the tread of the tire.

7. The combination with a rotary holder and a tire thereon, of a carriage longitudinally adjustable toward and from the tire, a laterally adjustable stand pivotally supported on the carriage and a tool-bed mounted at the top of the stand, a rotary cutting tool mounted on the bed and longitudinally adjustable in a plane tangential to the plane of the tread of the tire, complementary arcuate flanges on said stand and carriage and a clamp jaw engaged over said flanges, and an adjusting screw-bar mounted in the jaw and journaled in a bracket of the bed.

CURTISS X. HASKINS.